United States Patent [19]

Kanemaru

[11] 4,112,440
[45] Sep. 5, 1978

[54] CONTROL CIRCUIT FOR EXPOSURE INFORMATION INDICATOR

[75] Inventor: Kenji Kanemaru, Musashino, Japan

[73] Assignee: Fuji Photo Optical Co., Ltd., Omiya, Japan

[21] Appl. No.: 771,994

[22] Filed: Feb. 25, 1977

[30] Foreign Application Priority Data

Feb. 25, 1976 [JP] Japan .................................. 51-18960

[51] Int. Cl.$^2$ ............................................. G03B 17/20
[52] U.S. Cl. .................................... 354/23 D; 354/53; 354/60 L
[58] Field of Search ...................... 354/23 D, 53, 60 L

[56] References Cited

U.S. PATENT DOCUMENTS

| | | | |
|---|---|---|---|
| 3,955,892 | 5/1976 | Numata et al. | 354/60 L |
| 4,035,815 | 7/1977 | Takahashi | 354/60 L |
| 4,048,644 | 9/1977 | Numata | 354/60 L |
| 4,051,491 | 9/1977 | Toyoda | 354/60 L |

OTHER PUBLICATIONS

"Designing with TTL Integrated Circuits", Texas Instruments, Aug. 21, 1975, p. 261 and p. 267.

Primary Examiner—Russell E. Adams

[57] ABSTRACT

A photoreceptor is connected to an operational amplifier to convert the scene brightness to a voltage. The output of the operational amplifier is connected to a light emitting indicator to indicate exposure information. The output of the operational amplifier is also connected to an indicator brightness control circuit which changes the luminance of the light emitting indicator according to the scene brightness so that the luminance of the indicator is increased when the scene brightness is high and vice versa. The control circuit includes a digital signal generator which outputs digital level signals and a selecting circuit which selects the digital signals and controls the luminance of the indicator according to the selected signals. In order to prevent flickering of the indicator, a hysteresis is provided in the selecting circuit.

4 Claims, 7 Drawing Figures

CONTROL CIRCUIT FOR EXPOSURE INFORMATION INDICATOR

BACKGROUND OF THE INVENTION

1. Field of the Invention

This invention relates to a circuit for controlling the brightness of a light emitting indicator, and more particularly to an electric control circuit which controls the brightness of an indicator consisting of light emitting diodes provided in the field of view of a viewfinder of a photographic camera for indicating exposure information.

2. Description of the Prior Art

In the conventional photographic cameras, it has been known to indicate exposure information such as shutter speed or aperture size which is automatically controlled by an exposure control circuit provided in the camera. The exposure information is indicated by an indicator consisting of light emitting diodes provided in the field of view of the viewfinder of the camera. Since the viewfinder is used to view the scene to be photographed, the brightness of the indicator is desired to be changed as the brightness of the scene is changed. If the brightness of the indicator is too high when the scene brightness is low, the scene is hard to see because of the halation caused by the bright indicator. To the contrary, if the brightness of the indicator is low when the scene brightness is very high for instance in case of shooting an object in the snowy scene, the indicator becomes hard to see.

Further, in the conventional photographic camera with an exposure control circuit, there is provided a photoreceptor for measuring the scene brightness in the viewfinder optical system. The photoreceptor provided in the viewfinder system receives to some extent the light emitted by the indicator in the viewfinder system. The amount of the light from the indicator received by the photoreceptor will cause an error in the exposure control. Therefore, from this viewpoint also, it is desirable that the brightness of the indicator should be lowered when the brightness of the scene is low.

SUMMARY OF THE INVENTION

In view of the above description and observations, the primary object of the present invention is to provide a control circuit which controls the brightness of the exposure information indicator provided in the field of view of the viewfinder of the camera in accordance with the scene brightness.

More specifically, the object of the present invention is to provide a control circuit for an exposure information indicator provided in the viewfinder system of a camera which lowers the brightness of the indicator when the scene brightness is low and vice versa.

Another object of the present invention is to provide a control circuit for an exposure information indicator provided in the viewfinder system of a camera which does not change the brightness of the indicator if the scene brightness is abruptly changed in a comparatively small range of brightness, whereby the flicker of the indicator is prevented.

The above described objects are accomplished by providing a circuit which converts the scene brightness measured by the photoreceptor used for exposure control into a level of voltage and selects timing pulses according to the level of voltage and changes the brightness of the indicator by changing the duty of the current supplied to the indicator by means of the timing pulses. In order to prevent the flicker of the indicator, a flip-flop is used to provide a hysteresis to the circuit for controlling the brightness of the indicator.

DESCRIPTION OF THE PREFERRED EMBODIMENT

Figure 1:
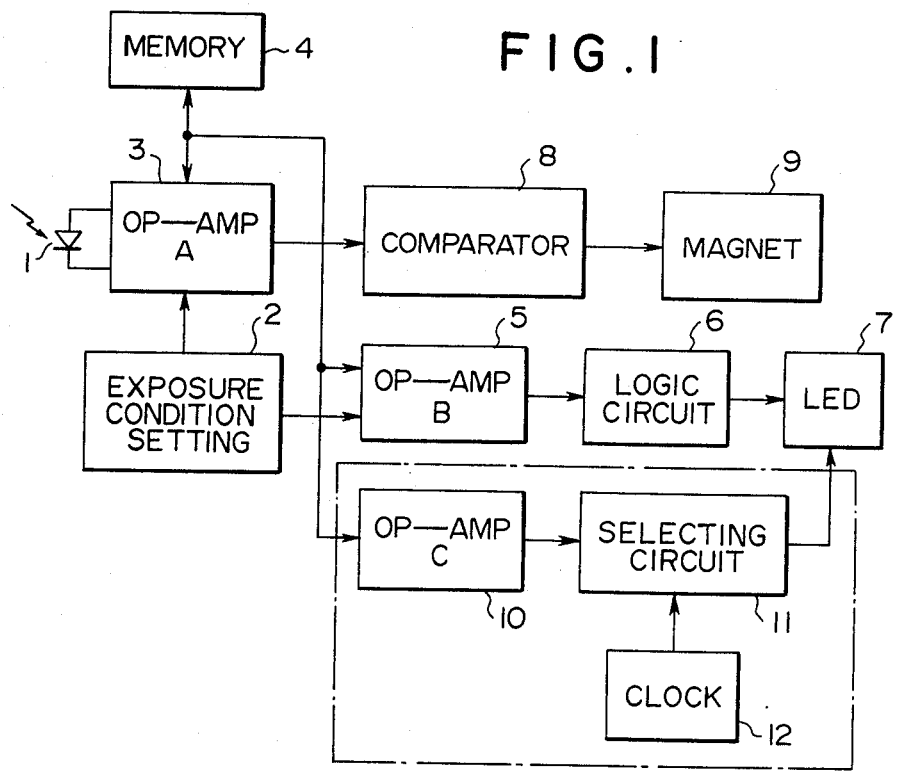
FIG. 1 is a block diagram showing an example of an exposure control and indicating circuit provided in a camera to which the control circuit in accordance with the present invention is applied.

Referring to FIG. 1 which shows the whole structure of an exposure control circuit including an exposure information indicator to which the control circuit for controlling the indicator brightness is connected, a photoreceptor 1 such as a silicon blue cell is connected to an operational amplifier-A (hereinafter referred to simply as "amp-A"). The scene brightness immediately before the shutter is released is measured by the photoreceptor 1 and is converted to a level of voltage by the amp-A 3. The output voltage of the amp-A 3 is memorized by a memory 4 connected thereto. An exposure condition setting means 2 is connected to the amp-A to put the information such as the film sensitivity and the manually set aperture size into the amp-A 3. The exposure condition setting means 2 is further connected to an operational amplifier-B (amp-B) 5 to which the output of said memory 4 is given. The scene brightness once memorized, the film sensitivity and the aperture size are operated through the amp-B 5. The output of the amp-B 5 is connected to a logic circuit 6 through which the output signal from the amp-B 5 is converted to a shutter speed. The shutter speed indicating signal thus made is then sent to a light emitting indicator 7 consisting of light emitting diodes to indicate the shutter speed in a digital form in the field of view of a viewfinder system of a camera. On the other hand, the memorized scene brightness, the film sensitivity and the aperture size are operated through the amp-A 3 and the output thereof is sent to a comparator 8 which is connected to a shutter speed control magnet 9. The shutter speed control magnet 9 is energized to close the shutter when the comparator 8 has detected the optimum exposure time.

The control circuit for changing the brightness of the indicator 7 is comprised of an operational amplifier-C (amp-C) 10 connected to the output of the amp-A 3 to receive the level of voltage from the amp-A 3, a selecting circuit 11 connected to the output of the amp-C 10, and a clock pulse generator 12 connected to the selecting circuit 11. The output of the selecting circuit 11 is connected to a power supply means (not shown) of the light emitting indicator 7. These elements constituting the control circuit is enclosed with a dot-and-dash line in FIG. 1.

Figure 2:
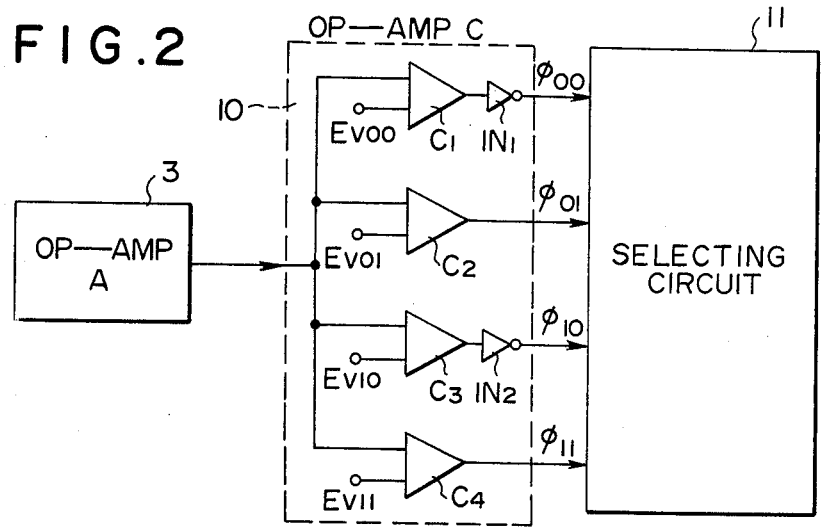
FIG. 2 is a circuit view showing the main portion of the control circuit in accordance with the present invention.

FIG. 2 shows an example of the amp-C 10 connected between the amp-A 3 and the selecting circuit 11. The amp-C 10 is comprised of four differential amplifiers C1 to C4 one input of which is connected with the output of the amp-A 3 and two inverters IN1 and IN2 connected between the output of the differential amplifiers C1 and C3 and the input of the selecting circuit 11. The other inputs of the differential amplifiers C1 to C4 is supplied with standard input voltages $E_{v00}$, $E_{v01}$, $E_{v10}$ and $E_{v11}$, respectively. The outputs of the differential amplifiers C1 to C4 give digital signals $\phi_{00}$, $\phi_{01}$, $\phi_{10}$ and $\phi_{11}$ having predetermined voltage, respectively, which are put into the selecting circuit 11.

Figure 3:
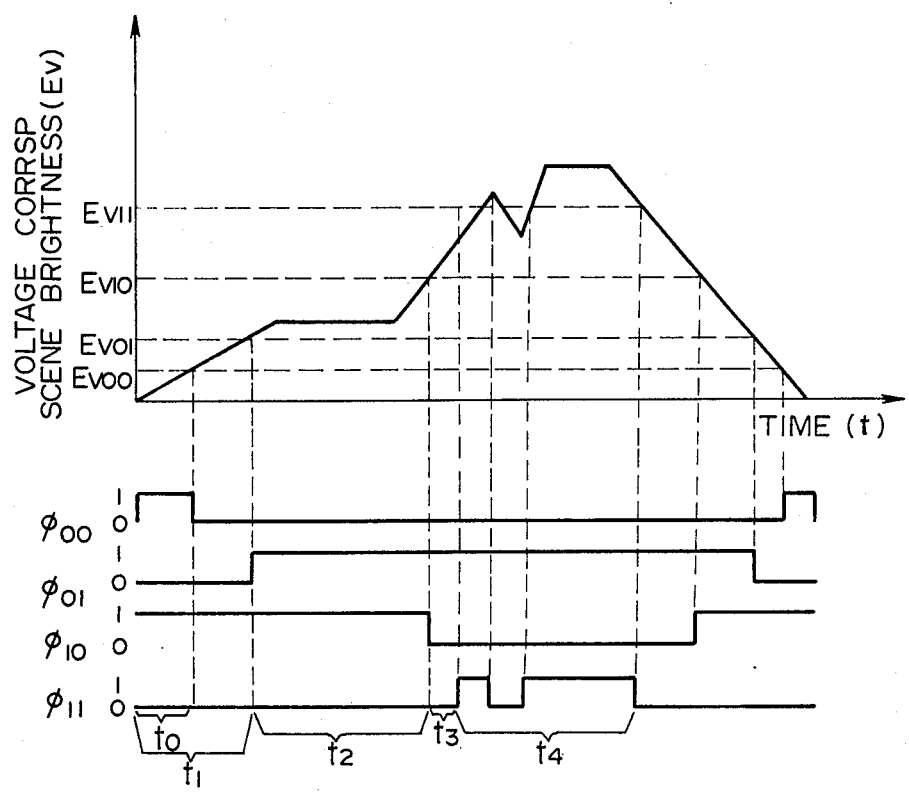
FIG. 3 is an explanatory timing chart which shows the relationship between the scene brightness and the input signals put into a flip-flop of the control circuit of this invention.

Referring to FIG. 3 which shows the relationship between the scene brightness and the output of the amp-C 10, the base line of the above graph represents the lowest scene brightness and the ordinate represents the voltage $E_v$ corresponding to the scene brightness. In the example shown in FIG. 3, four standard voltages $E_{v00}$, $E_{v01}$, $E_{v10}$ and $E_{v11}$ are predetermined. The timing chart shown below the graph of the scene brightness indicates the output voltages $\phi_{00}$, $\phi_{01}$, $\phi_{10}$ and $\phi_{11}$ of the four differential amplifiers C1 to C4 obtained in accordance with the change in the scene brightness as shown in the graph of FIG. 3. The inverters IN1 and IN2 are connected to the output of the differential amplifiers C1 and C3 for the purpose of providing hysteresis in the selecting circuit 11.

The output voltage signal $\phi_{00}$ is "1" from the position where the scene brightness is the lowest to the position where the scene brightness comes to the first standard level $E_{v00}$. The signal $\phi_{00}$ becomes "0" when the scene brightness exceeds the level $E_{v00}$. The output voltage signal $\phi_{01}$ is "1" when the voltage $E_v$ is higher than the second standard level $E_{v01}$ and "0" when $E_v$ is not higher than $E_{v01}$. The signal $\phi_{10}$ is "1" when $E_v$ is not higher than $E_{v01}$ and "0" when $E_v$ is higher than $E_{v01}$. The signal $\phi_{11}$ is "1" when $E_v$ is higher than $E_{v11}$ and "0" when $E_v$ is not higher than $E_{v11}$.

Figure 4:
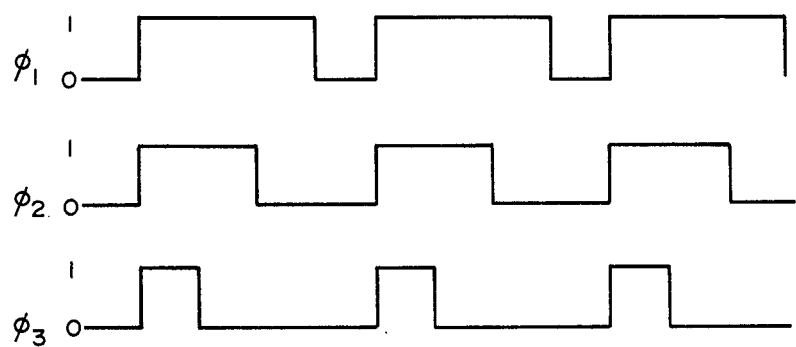
FIG. 4 is a timing chart showing clock pulses employed in the control circuit of this invention.

Further in the present invention, timing pulses $\phi_1$ to $\phi_3$ as shown in FIG. 4 are used to change the luminance of the light emitting diodes of the indicator 7. The timing pulses are put into AND circuits L2 to L4 of the selecting circuit 11. The pulse $\phi_1$ has the largest width, the pulse $\phi_2$ has the second largest width, i.e., two thirds as large as that of the pulse $\phi_1$, and the pulse $\phi_3$ has the smallest width, i.e., one third as large as that of the pulse $\phi_1$. These pulses are generated from the clock pulse generator 12. Though FIG. 4 shows only three kinds of pulses, more than three kinds of pulses can of course be employed to change the luminance of the light emitting diodes in more than three steps.

Now the detailed structure of the selecting circuit 11 and the light emitting diode indicator 7 will be described with reference to FIG. 5.

Figure 5:
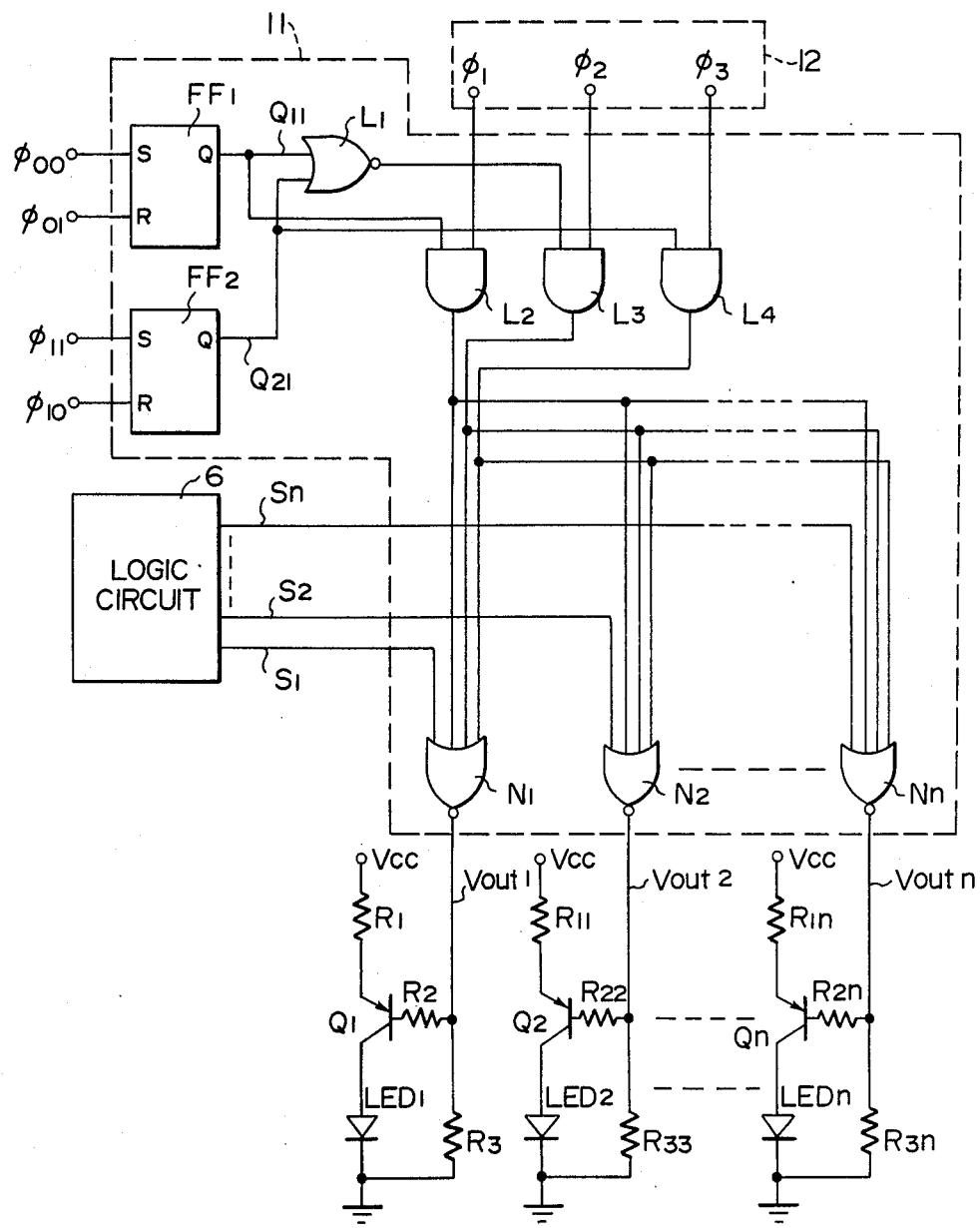
FIG. 5 is a circuit view of an example of a selecting circuit used in this invention.

In FIG. 5, the lower part of the circuit shows the light emitting diode indicator which comprises power sources Vcc, current limiting resistors $R_1$, $R_{11}$ ... $R_{1n}$ connected thereto, switching pnp transistors $Q_1$, $Q_2$ ... $Q_n$ connected thereto, light emitting diodes $LED_1$, $LED_2$ $LED_n$ connected thereto, resistors $R_2$, $R_{22}$ ... $R_{2n}$ connected to the base of the transistors $Q_1$, $Q_2$ ... $Q_n$, and resistors $R_3$, $R_{33}$ ... $R_{3n}$ connected in parallel with said light emitting diodes $LED_1$, $LED_2$ ... $LED_n$. The resistors $R_2$, $R_{22}$ ... $R_{2n}$ are connected to the output of logic circuits hereinafter described so that the transistors $Q_1$, $Q_2$ ... $Q_n$ are turned on according to the output of the logic circuits to turn on the light emitting diodes selectively. Instead of said switching means using the pnp transistors $Q_1$, $Q_2$ ... $Q_n$ may be used insulated gate type field effect transistors (FET).

Said logic circuit is composed of reset priority type RS flip-flop circuits $FF_1$ and $FF_2$, NOR circuits $L_1$, $N_1$ to $N_n$ and AND circuits $L_2$ to $L_4$. The reset priority type flip-flop circuit is characterized in that the output is determined by the reset signal when a set input signal and a reset input signal conflict with each other. In other words, when "1" is put in the set side input, an output "1" is given, and the "1" output is maintained until "1" level is put in the reset side input, then the output is inversed by the reset signal of "1" level. The flip-flop circuits $FF_1$ and $FF_2$ are provided with said timing signals $\phi_{00}$, $\phi_{01}$, $\phi_{10}$, $\phi_{11}$. The NOR circuit $L_1$ is provided with two inputs from the set side output $Q_{11}$ of the flip-flop $FF_1$ and from the set side output $Q_{21}$ of the flip-flop circuit $FF_2$. One input of the AND circuits $L_2$ to $L_4$ is provided with said clock pulses $\phi_1$ to $\phi_3$ as shown in FIG. 4, respectively. The other input of the AND circuit $L_2$ is supplied with the output $Q_{11}$ of the flip-flop circuit $FF_1$, the other input of the AND circuit $L_3$ is supplied with the output of the NOR circuit $L_1$ and the other input of the AND circuit $L_4$ is provided with the output $Q_{21}$ of the flip-flop circuit $FF_2$. The logic circuit 6 shown in FIG. 5 has a number of output terminals $S_1$ to $S_n$ corresponding to the number of light emitting diodes and gives signals to turn on the corresponding light emitting diodes. In this invention, the lighting signal is "0." All the lines other than the line selected by the level "0" made to output level "1." The output lines $S_1$ to $S_n$ are connected to an input terminal of every NOR circuit $N_1$ to $N_n$ which gives a lighting signal. The other three inputs of the respective NOR circuits $N_1$ to $N_n$ are provided with the output of the AND circuits $L_2$ to $L_4$. The output $V_{out1}$ to $V_{outn}$ of the NOR circuits $N_1$ to $N_n$ is connected to said base of the switching transistors $Q_1$ to $Q_n$.

Now the operation of the above described circuit will be described in detail with reference to the drawings for every state of the circuit.

Figure 6:
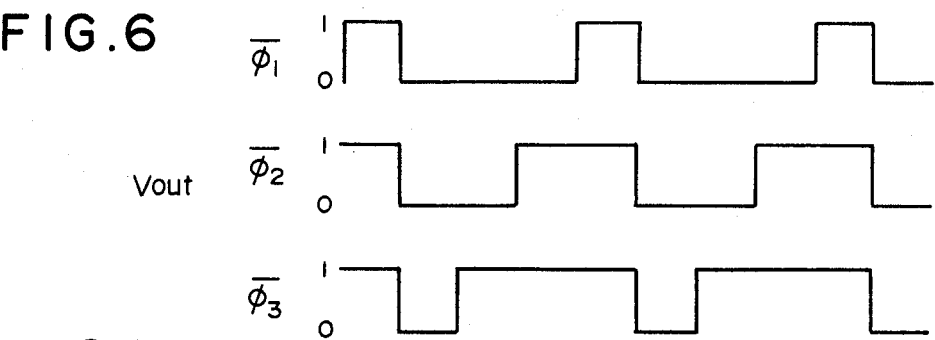
FIG. 6 is a timing chart of output signals given by the selecting circuit used in this invention.

(1) When the voltage based on the scene brightness is below the standard level $E_{v01}$ shown in FIG. 3:

In this state which is indicated by the period $t_1$ in FIG. 3, the output $Q_{11}$ of the flip-flop $FF_1$ is "1" since $\phi_{00}$ is "1." Further, the output $Q_{21}$ of the flip-flop $FF_2$ is "0" since $\phi_{10}$ is "1." Therefore, the output of the NOR circuit $L_1$ which receives said two outputs $Q_{11}$ and $Q_{21}$ is "0." Accordingly, the gate of the AND circuit $L_2$ which receives the output $Q_{11}$ ("1") of the flip-flop $FF_1$ is opened and the output $\phi_1$ thereof is given to the NOR circuits $N_1$ to $N_n$. Then, the line selected by the logic circuit 6, e.g., $S_1$, is set to "0" level and the other lines are set to "1" level. Only the gate of the NOR circuit $N_1$ receiving said selected line $S_1$ is opened, accordingly. The output $V_{out1}$ thereof has the timing $\overline{\phi}_1$ as shown in FIG. 6 and the transistor $Q_1$ is closed for the period corresponding to said timing $\overline{\phi}_1$ to light the light emitting diode $LED_1$. Thus, in this state, the period for which the power is supplied to said $LED_1$ is the shortest, which results in the lowest luminance of the light emitting diode $LED_1$.

(2) When the voltage based on the scene brightness is between the level $E_{v10}$ and $E_{v01}$ shown in FIG. 3:

In this state which is indicated by the period $t_2$ in FIG. 3, the output $Q_{11}$ of the flip-flop $FF_1$ is "0" since the outputs $\phi_{01}$ and $\phi_{10}$ are "1," and the output $Q_{21}$ of the flip-flop $FF_2$ is also "0." Therefore, the output of the NOR circuit $L_1$ receiving said two outputs $Q_{11}$ and $Q_{21}$ is "1." Accordingly, the gate of the AND circuit $L_3$ which receives the output of the NOR circuit $L_1$ is opened and the output $\phi_2$ thereof is given to the NOR circuits $N_1$ to $N_n$. Then, the line selected by the logic circuit 6, e.g., $S_2$, is set to "0" and the other lines are set to "1" level. Only the gate of the NOR circuit $N_2$ receiving the selected line $S_2$ is opened, accordingly. Then output $V_{out}$ thereof has the timing $\bar{\phi}_2$ as shown in FIG. 6 and the transistor $Q_2$ is closed for the period corresponding to said timing $\bar{\phi}_2$ to light the light emitting diode $LED_2$. Thus, in this state, the period for which the power is supplied to said $LED_2$ is twice as long as the period for which the power is supplied to said $LED_1$ in the above case (1), which results in the comparatively high luminance of the light emitting diode $LED_2$.

(3) When the voltage based on the scene brightness is between the level $E_{v11}$ and $E_{v10}$ shown in FIG. 3:

In this state which is indicated by the period $t_3$ in FIG. 3, the output $Q_{11}$ of the flip-flop $FF_1$ is "0" since only the output $\phi_{01}$ is "1." Since the flip-flop $FF_2$ is still in a reset state, the output $Q_{21}$ thereof is "0." Accordingly, the gate of the AND circuit $L_3$ which receives the clock pulse $\phi_2$ is opened. Thus, the light emitting diode is turned on in quite the same manner as in the aforesaid state (2). Therefore, in this period, a constant luminance is maintained even if the voltage changes within the range of this state. Thus, a hysteresis effect is obtained.

(4) When the voltage based on the scene brightness is above the standard level $E_{v11}$ shown in FIG. 3:

In this state which is indicated by the period $t_4$ in FIG. 3, the output $Q_{11}$ of the flip-flop $FF_1$ is "0" and the output $Q_{21}$ of the flip-flop $FF_2$ is "1" since $\phi_{01}$ and $\phi_{11}$ are "1." Accordingly, only the gate of the AND circuit $L_4$ which receives the clock pulse $\phi_3$ is opened and the clock pulse $\phi_3$ is given to the NOR circuits $N_1$ to $N_n$. Then, the line selected by the logic circuit 6, e.g., $S_n$, is set to "0" level and the other lines are set to "1" level. Only the gate of the NOR circuit $N_n$ receiving said selected line $S_n$ is opened, accordingly. The output $V_{out}$ thereof has the timing $\bar{\phi}_3$ as shown in FIG. 6 and the transistor $Q_n$ is closed for the period corresponding to said timing $\bar{\phi}_3$ to light the light emitting diode $LED_n$. Thus, in this state, the period for which the power is supplied to said $LED_n$ is the longest which results in the highest luminance of the light emitting diode $LED_n$.

The output $\phi_{11}$ shown in FIG. 3 is first turned to "1" and then turned to "0" and again returned to "1." This change corresponds to an abrupt change in the scene brightness. In this case, even in the state where the output is turned to "0,", the output of the flip-flop does not change, and accordingly, the luminance of the light emitting diode is not changed and no flicker occurs.

Now the reason for the hysteresis obtained in the above circuit will be described in detail. As apparent from the above description of the operation, the clock pulse $\phi_1$ or $\phi_2$ is selected in view of the standard voltage $E_{v01}$, and the clock pulse $\phi_2$ or $\phi_3$ is selected in view of the standard voltage $E_{v11}$. Therefore, if the scene brightness fluctuates around these standard voltages, the selection of the clock pulses is also changed accordingly. In such as case, the luminance of the light emitting diode is changed abruptly and a flicker occurs. In this invention, in order to remove such a defect, a hysteresis is provided by use of flip-flop circuits $FF_1$ and $FF_2$ and timing signals $\phi_1$, $\phi_2$ and $\phi_3$ for setting the timing of the voltage signals $\phi_{00}$, $\phi_{01}$, $\phi_{10}$ and $\phi_{11}$. That is, when the voltage based on the scene brightness has exceeded the standard voltage $E_{v01}$ and the clock pulse $\phi_2$ is applied to the light emitting diode, the clock pulse $\phi_2$ remains to be selected even if the voltage based on the scene brightness changes unless it falls below the first standard voltage $E_{v00}$. Once it has fallen below $E_{v00}$ and the clock pulse $\phi_1$ is selected, this state is not changed until the voltage exceeds the second standard voltage $E_{v01}$. Such a hysteresis effect is the same for the clock pulses $\phi_2$ and $\phi_3$. Therefore, by properly selecting the level of the standard voltage, an indicator which does not flicker almost at all can be obtained.

Figure 7:
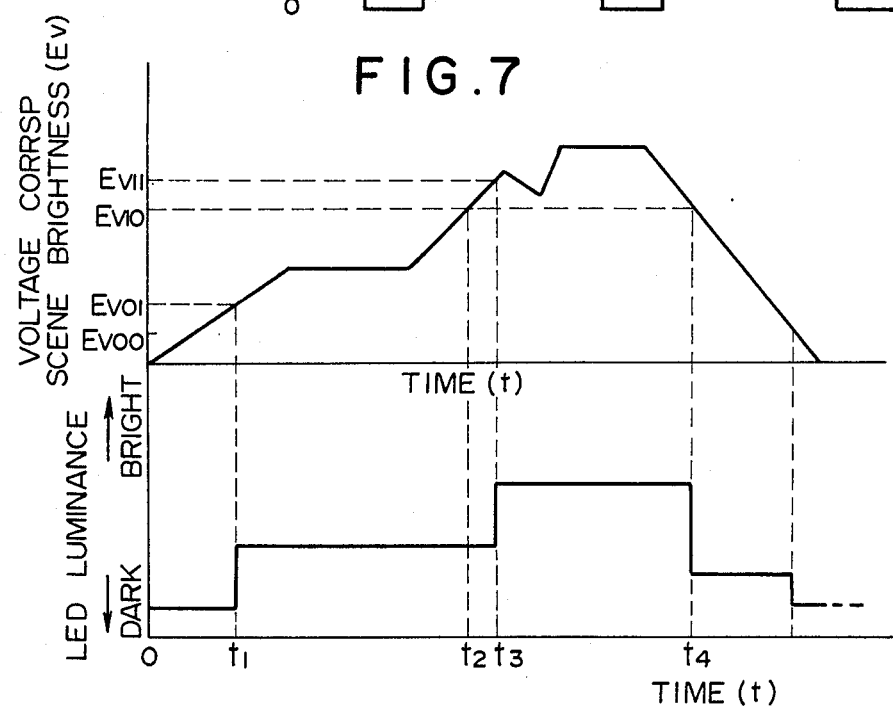
FIG. 7 is an explanatory timing chart which shows the relationship between the scene brightness and the resulting brightness of the light emitting indicator.

The results obtained by the above described operation are shown in FIG. 7 wherein the luminance of the light emitting diode is changed without a flicker as the scene brightness changes.

I claim:

1. A control circuit for an exposure information indicator in a photographic camera in which a light measuring photoreceptor is connected to a circuit for converting the output of the photoreceptor to a voltage indicative of the scene brightness measured by the photoreceptor, and the output of the circuit is used for indicating exposure information by means of a light emitting indicator wherein the improvement comprises means connected with said converting circuit for generating a plurality of digital output signals which represent the level of the output voltage of said converting circuit, a plurality of means for generating pulses which have different duty cycles, and a selecting circuit connected at its input with said signal generating circuit and said plurality of pulse generating means and at its output with said light emitting indicator for selecting said plurality of digital output signals and selecting said pulses of different duty cycles to be fed to the light emitting indicator, whereby the luminance of the light emitting indicator is controlled to correspond to the scene brightness.

2. A control circuit for an exposure information indicator as defined in claim 1 wherein said means for generating a plurality of digital output signals comprises a plurality of differential amplifiers connected with said converting circuit at an input thereof and connected with standard voltage sources of different level respectively at the other input thereof.

3. A control circuit for an exposure information indicator as defined in claim 1 wherein said selecting circuit includes a means for giving a hysteresis effect to the light emitting indicator.

4. A control circuit for an exposure information indicator as defined in claim 3 wherein said means for giving a hysteresis effect to the light emitting indicator comprises a plurality of flip-flops connected to the outputs of said differential amplifiers, a plurality of clock pulse generators which generate clock pulses of different pulse width, and gate circuits connected with said flip-flops and said clock pulse generators to provide outputs to said light emitting indicator according to the outputs from the flip-flops and the clock pulse generators.

* * * * *